United States Patent [19]

Vanderpool et al.

[11] Patent Number: 4,584,406

[45] Date of Patent: * Apr. 22, 1986

[54] PREPARATION OF LINEAR POLYETHYLENEPOLYAMINES WITH MODIFIED CATALYSTS

[75] Inventors: Steven H. Vanderpool, New Braunfels; Terry L. Renken, Austin, both of Tex.

[73] Assignee: Texaco Inc., White Plains, N.Y.

[*] Notice: The portion of the term of this patent subsequent to Mar. 25, 2003 has been disclaimed.

[21] Appl. No.: 678,864

[22] Filed: Dec. 6, 1984

Related U.S. Application Data

[62] Division of Ser. No. 455,156, Jan. 3, 1983.

[51] Int. Cl.$^4$ .............................................. C07C 85/06
[52] U.S. Cl. .................................... 564/479; 564/485; 564/509; 564/512; 260/687 R
[58] Field of Search ............... 564/479, 485, 509, 512; 260/687 R

[56] References Cited

U.S. PATENT DOCUMENTS

| | | | |
|---|---|---|---|
| 2,349,243 | 5/1944 | Bates | 502/208 X |
| 2,584,102 | 2/1952 | Mavity | 502/214 |
| 2,824,073 | 2/1958 | Rylander et al. | 502/208 |
| 2,921,081 | 1/1960 | Zimmerschied et al. | 502/208 X |
| 3,297,701 | 1/1967 | Brader et al. | 260/268 |
| 3,342,820 | 9/1967 | Brader | 260/268 |
| 4,036,881 | 7/1977 | Brennan et al. | 260/583 |
| 4,044,053 | 8/1977 | Brennan et al. | 260/583 |
| 4,103,087 | 7/1978 | Brennan | 544/78 |
| 4,314,083 | 2/1982 | Ford et al. | 544/479 |
| 4,316,840 | 2/1982 | Ford et al. | 260/239 |
| 4,400,568 | 8/1983 | Hofmann et al. | 502/208 X |
| 4,448,997 | 5/1984 | Brennan | 564/479 |

FOREIGN PATENT DOCUMENTS

1317359 2/1963 France .
2092467 1/1982 United Kingdom .

OTHER PUBLICATIONS

A. Winkler & E. Thilo (Deutsche Akad. Wiss. Berlin), Z. Anurg Chem., 346 (1-2), 65CA 14807c, 1966.

Primary Examiner—Charles F. Warren
Assistant Examiner—John A. Sopp
Attorney, Agent, or Firm—Robert A. Kulason; Jack H. Park; Kenneth R. Priem

[57] ABSTRACT

This invention is directed to pelletted catalyst compositions supported on group IVb transition metal oxides that contain phosphorous derived from phosphoryl chloride or phosphorous bromide and their use in the production of predominantly linear polyethylenepolyamines from ethylenediamine and monoethanolamine.

15 Claims, No Drawings

PREPARATION OF LINEAR POLYETHYLENEPOLYAMINES WITH MODIFIED CATALYSTS

This is a division of application Ser. No. 455,156, filed Jan. 3, 1983.

BACKGROUND OF THE INVENTION

1. Technical Field of the Invention

This invention relates to the preparation of predominantly linear polyethylenepolamines from the starting reagents of ethylenediamine and monoethanolamine in the presence of unique thermally activated catalyst compositions comprising a group IVb transition metal oxide support and phosphorous derived from phosphorous bromide or phosphoryl chloride.

2. Prior Art

Heretofore, polyethylenepolyamine compounds such as diethylenetriamine, triethylenetetramine and the higher homologs have been produced by the reaction of an alkyl halide such as ethylene dichloride with an amine such as ammonia or ethylenediamine at elevated temperatures and pressures. Normally, relatively high yields of predominatly non-cyclic polyethylenepolyamine compounds are obtained from this process with varying yields of heterocyclic amines. The large amounts of energy required to produce the reactants as well as the difficult separation procedures required to recover the more valuable linear polyethylenepolyamines diminish the usefulness of ethylene dichloride process. The hydrohalide salts of ammonia and the polyethylenepolyamine products must also undergo difficult and time consuming caustic neutralization to yield the free polyethylenepolyamines.

It has heretofore been known that phosphates can be used to catalyze reactions products to produce predominately heterocyclic rather than linear products. Thus U.S. Pat. No. 3,297,701 teaches the use of aluminum phosphate to catalyse the reaction of ethanolamines and polyethylenepolyamines to yield cyclic compounds. U.S. Pat. No. 3,342,820 discloses the use of aluminum phosphate for the preparation of heterocyclic compounds such as triethylenediamine. As another example, U.S. Pat. No. 4,103,087 also discloses the use of aluminum phosphate catalysts for producing heterocyclic product compounds.

More recently, investigators have found that more linear products can also be obtained in a catalystic conversion. Thus, Ford et. al. U.S. Pat. No. 4,316,840 discloses the preparation of polyalkylenepolyamines from ethylene diamine utilizing a metal nitrate or sulfate as a catalyst. U.S. Pat. No. 4,314,083 discloses the reaction of ethylene diamine with monoethanolamine to prepare noncyclic polyalkylenepolyamines using, as a catalyst, a salt of a nitrogen or sulfur-containing compound.

In inventions originating in our laboratories, Brennan et. al. in U.S. Pat. No. 4,036,881 discloses the use of phosphorous-containing catalysts to catalyze the reaction of ethylenediamine with monoethanolamine. Excellent results were obtained when the reaction was conducted in an autoclave. However, when the phosphorous compound was supported on silica or diatomaceos earth, good results were obtained only at comparatively low conversions. Brennan et. al. U.S. Pat. No. 4,044,053 is also relevant in this regard. A recently filed Brennan copending application Ser. No. 283,713, filed July 16, 1981 (now abandoned) and entitled "Preparation of Linear Polyethylenepolyamines With an Aluminum Phosphate Catalyst" is directed to an aluminum phosphate catalyst. Excellent results were obtained using a catalyst of this nature in batch-type reactions. Brennan U.S Pat. No. 4,103,087 discloses the use of pelleted aluminum phosphate to prepare di-(N,N-disubstituted amino)alkanes.

French Pat. No. 1,317,359 dated Feb. 8, 1963, discloses the preparation of granulated zirconium phosphate and its use as an ion-exchange resin. Winkler et al. in a 1966 publication [Deutsche Akad. Wiss., Berlin, Germany, Z. Anorg. Allgen. Chem. 346 (1-2), 92–112 (1966)] disclose compounds of the general formula $HX^{iv}P_2O_3$ wherein X represents arsenic, antimony and mixtures thereof. Also disclosed are compounds of the general formula $H_2X^{iv}P_2O_3$, wherein X represents silicon, germanium, tin, lead, titanium and zirconium. It is shown that the group IV phosphates have cation exchange properties.

Daniel Br. Apcn. No. 2,092,467 pub. Aug. 18, 1982, modifies iron phosphate catalysts disclosed in Cavaterra U.S. Pat. No. 3,948,959 for making methacrylic acid from isobutyric acid. Daniel uses such catalysts in admixture with a support prepared by calcining the dried powder recovered from a slurry of silica with phosphoric acid. Daniel teaches that the support is inert and that titania or zirconia can also be used.

SUMMARY OF THE INVENTION

A method of preparing novel catalyst compositions is disclosed. The catalyst is extremely useful in the improved production of predominatly linear polyethylenepolyamines from ethylenediamine and monoethanolamine reactants. The novel catalysts of the claimed invention can be prepared by treating a group IVb metal oxide support with phosphoryl chloride or phosphorous bromide such that, in a thermally activated condition, the phosphorous is chemically bound to the support. These novel catalyst compositions can be used to catalyze the reaction of monoethanolamine with ethylenediamine to provide essentially linear polyethylenepolyamine reaction products.

DETAILED DESCRIPTION

In one aspect the invention is directed to improved catalyst compositions comprising a group IVb metal oxide to which phosphorous derived from phosphoryl chloride or phosphorous bromide has been chemically bonded by thermal activation. In another aspect the catalysts are used in producing essentially linear polyethylenepolyamines such as diethylenetriamine, triethylenetetramine, tetraethylenepentamine and pentaethylenehexamine from the reaction of ethylenediamine and monoethanolamine. The inventor is unaware of the precise structural differences between the claimed catalysts and previous phosphate catalysts that have been tried in such reactions, but is cognizant of substantially higher rates of conversion to linear polyethylenepolyamines with the claimed catalysts.

The novel catalyst compositions catalyze the reaction of ethylenediamine with monoethanolamine at a temperature of from about 250° C. to about 400° C., preferably from about 300° C. to about 350° C. and a pressure of from about 500 to about 3000 psig. and preferably from about 1000 to about 2000 psig. Higher temperatures and pressures can be used but there is no particular advantage in using higher temperatures and/or pressures. The ratio of ethylenediamine to monoethanolamine may range from about 1:2 to about 5:1.

The pelleted catalyst compositions of the present invention are normally employed as a fixed bed of catalyst in a continuous reaction system. In a continuous process of this nature, the time of contact of the reactants with the catalyst is one of the interrelated factors that those skilled in the art will adjust, along with temperature, pressure, bed geometry, pellet size, etc. in order to obtain a desired rate of reaction and, hence, a desired percentage of conversion of the reactants. Thus, in a continuous process, it is not necessary to drive the reaction to completion because unreacted feedstock components can be recycled to the reactor.

It is customary to use cylindrically-shaped catalyst pellets having a diameter essentially equal to the length thereof, such as diameters and lengths ranging from about 1/32" to about ⅜". It will be understood that the shape and dimensions of the pellets are not critical to the present invention and that pellets of any suitable shape and dimensions may be used as desired, by one wishing to practice the process of the present invention.

When cylindrical pellets of catalyst of the type described above are used, the weighted hourly space velocity may be varied within wide limits (e.g., 0.1 to 5 w/hr/w) in order to obtain a desired date of conversion, as explained above. Normally, the space velocities of about 0.5 to 2 w/hr/w will be employed.

Catalyst life is an important factor in conducting a continuous reaction. For example, if a catalyst is easily poisoned, or if catalyst pellets do not have good structural properties, the economics of the process will be seriously and adversely affected.

The catalysts of the present invention are not particularly susceptible to poisoning so this normally does not present a problem. However, under the reaction conditions employed, amines of the type used and formed herein have the potential capability of leaching or otherwise adversely affecting the structural integrity of the pellets. In an extreme instance, catalyst pellets having good initial crush strength and surface hardness will be reduced to fines very rapidly when used under reaction conditions such as those employed herein.

It is a feature of the present invention that the pelleted catalyst compositions have improved resistance to physical degradation when used to catalyse the reaction of monoethanolamine with ethylenediamine.

The catalyst compositions of the present invention are prepared by depositing a phosphorus compound on a support comprising an oxide of a group IVb transition metal oxide. The group IVb transition metal oxides include the oxides of titanium, zirconium, hafnium and thorium. Pellets of the group IVb metal oxide may be prepared by extrusion or by compaction in conventional pelleting apparatus using a pelleting aid such as graphite. It is also within the scope of the present invention to deposit the phosphorus compound on a powdered IVb metal oxide followed by pelleting and calcination.

Phosphoryl chloride ($POCl_3$) or phosphorous bromide ($PBr_3$) is used as a source for the phosphorous.

When the catalyst composition is to be prepared by impregnating a preformed pellet, a suitable procedure to be used is to heat the phosphoryl chloride or phosphorous bromide to reflux temperature (e.g., about 105° C.) and to then add pellets in an amount about equal to the volume of the heated liquid. Thereafter heating is continued. This treatment should be continued from about 0.5 to about 5 hours. At the end of that time, the resulting slurry may be cooled. When the resulting mixture is treated with water the phosphoryl chloride and/or phosphorous bromide is hydrolysed. When hydrolysis is complete the mixture of pellets and liquid is decanted to remove excess liquid followed by water washing to substantially completely remove unabsorbed liquid. Thereafter the composition may be dried and calcined at an appropriate temperature such as a temperature of about 200° C. to about 800° C.

It will be understood that the phosphorous that is present on a thus-treated pellet is not present as elemental phosphorous, but rather as phosphorous that is chemically bound, probably as an oxide, to the group IVb metal oxide support. This is demonstrated by the fact that repeated washing will not remove all of the phosphorous. However, the exact nature of the bonding is not completely understood.

The amount of phosphorous that is bonded or otherwise adheres to the support is a function of heating and other conditions used in the treating step and is also a function of the chemical identity of the phosphorous compound that is used as a source of phosphorous. Under the treating conditions exemplified above, at least about 2.5 wt % of phosphorous is caused to bond or otherwise permanently adhere to the pellets. There is an upper limit to the amount of phosphorous that bonds or otherwise permanently adheres to the support. This upper limit is, as indicated, a function of both the treating conditions and the chemical used as a source of the phosphorous. Normally, the maximum amount of phosphorous that can be caused to bond or otherwise permanently adhere to the pellets is within the range of about 5 to 10 wt. %.

When the pellets are impregnated with the phosphorous compound at a temperature of at least about 100° C., there is no absolute need to calcine the catalyst composition before use. However, the pellets can be calcined, if desired, as a precautionary measure and/or in order to still further improve the physical properties of the pellets. The pellets are suitably calcined at a temperature of about 200° C. to about 800° C. for a period of time within the range of 2 to 24 hours; more preferably at a temperature of about 500° C. to about 700° C. for about 4 to 16 hours.

Other procedures can be used in adding phosphrous to the group IVb metal oxide. For example, the pellets can be treated with the phosphorous compound at ambient temperatures or at more modest elevated temperatures of less than about 100° C. In this situation, however, it is necessary to thermally activate the treated pellets by calcining under the conditions recited above.

Alternatively, the group IVb metal oxide can be treated with the phosphorous-containing compound in powdered form and the powder can thereafter be pelleted. If the treatment is conducted at a temperature of about 100° C. or more, thermal activation will normally have been obtained and it will not be absolutely necessary to perform a calcining operation. If lower treating temperatures are used, calcining is a desired operation. The calcining operation can be conducted prior to or subsequent to the pelleting step. Any appropriate pelleting procedure of the type known to those skilled in the art may be used. For example, the treated powdered group IVb metal oxide can be mixed with graphite and/or other binders and compacted or extruded under conventional conditions.

There are many compounds which can be formed from the reaction of ethylenediamine and monoethanolamine besides the preferred linear polyethylenepolyamines such as diethylenetriamine, triethylenetetramine, tetraethylenepentamine and pentaethylenehexamine. Less desirable cyclics and other compounds, such as piperazine, N-(2-aminoethyl)ethanolamine and N-(2-aminoethyl)piperazine, are also formed. The more desired linear polyethylenepolyamines can be easily recovered from the reaction product mixture by conventional methods such as distillation. Such distillation recovery methods are well known in the art. An outstanding advantage of the claimed invention is that the lower molecule weight polyethylenepolyamines recovered from the reaction mixture can be further reacted with monoethanolamine to produce a larger percentage of the higher molecular weight linear polyethylenepolyamines.

The following examples will further illustrate the preparation of predominantly linear polyethylenepolyamines from ethylenediamine and monoethanolamine by the use of the catalyst compositions of the present invention. They are given by way of illustration and not as limitations on the scope of the invention. Thus, it will be understood that reactants, proportions of reactants, and time, temperature and pressure of the reaction steps may be varied with much the same results achieved.

For purposes of convenience and brevity, the reactant compounds employed and the products obtained have been abbreviated in the following examples and tables. The abbreviations employed for these various compounds are:

EDA—ethylenediamine
MEA—monoethanolamine
PIP—piperazine
DETA—diethylenetriamine
TETA—triethylenetetramine
TEPA—tetraethylenepentamine
AEEA—N-(2-aminoethyl)ethanolamine
AEP—N-(2-aminoethyl)piperazine
HEP—N-(hydroxyethyl)piperazine

EXAMPLE I

1. Titania Catalyst Preparation

A series of pelleted catalysts were prepared by depositing phosphorous on a titania support.

a. Phosphoric Acid

Titania supported phosphoric acid catalysts were prepared by heating about 100 cc of phosphoric acid to about 130° C. under an inert atmosphere in a flask fitted with a condenser. 105 cc of titania pellets were slowly added through the condenser and the temperature was maintained for the desired period of time.

Thereafter the catalyst was recovered by first decanting the excess phosphoric acid followed by the addition to the pellets of a large quantity of water. The pellets and water were slowly stirred to dissipate heat. The pellets were washed several times with copious amounts of water and dried.

b. Phosphoryl Chloride (Phosphrous Oxychloride) on Titania

When using phosphoryl chloride as the source of phosphorus, a slight modification of the above identified procedures was necessary. The phosphoryl chloride was refluxed at 105° C. The heat was turned off and the reflux was maintained by the addition of titania pellets at a rate sufficient to maintain a strong reflux.

When the resulting reaction mixture was treated with water the phosphoryl chloride was hydrolysed. Constant stirring was very important in order to maintain good heat dissipation. Phosphorus bromide was also used as a source of phosphorus using the procedure outlined above for phosphoryl chloride.

For convenience, the catalyst prepared and a brief description of the same is set forth herein as Table I.

TABLE I

TITANIA CATALYST COMPOSITIONS

| Type | Number | Composition |
|---|---|---|
| A | 5464-72 | 40 wt. % Phosphate on alumina |
| A | 5494-4 | Titania (TiO$_2$) |
| A | 5494-16 | Titania treated with phosphoric acid (H$_3$PO$_4$) for ½ hour |
| A | 5494-5 | Titania treated with phosphoric acid for 2 hours |
| A | 5494-17 | Titania treated with phosphoric acid for 12 hours |
| A | 5494-95 | Titania treated with phosphoric acid for 2 hours |
| A | 5494-96 | Titania treated with phosphoric acid for 4 hours |
| B | 494-13 | Titania treated with phosphoryl chloride (POCl$_3$) for 4 hours |
| B | 5494-23 | Titania treated with phosphoryl chloride for 4 hours and then calcined |
| B | 5494-31 | Titania calcined at 600° C., then treated with phosphoryl chloride and recalcined |
| C | 5494-20 | Titania treated with phosphorous bromide (PBr$_3$) for 2 hours |

Preparation of Polyethylenepolyamines from Ethylenediamine and Monoethanolamine Using Titania Supported Phosphorus Catalysts The catalysts described in Table I were utilized for the conversion of ethylenediamine and monoethanolamine to a polyethylenepolyamine reaction product in a 100 cc continuous reactor system. Pellets were placed in the reactor and the feedstock that was fed to the reactor was a mixture of ethylenediamine and monoethanolamine in a molar ratio of about two moles of ethylenediamine per mole of monoethanolamine.

In order to obtain a basis for comparison, the reaction temperature was varied so as to obtain about a 65% conversion of the monoethanolamine feedstock.

The reaction product was periodically sampled and analyzed by gas chromatographic analysis of the crude reactor effluent. Results were calculated on a feed-free basis.

The catalysts tested and results obtained in the series of tests are set forth in Table II. In general, each feedstock was run for at least 2½ hours to make sure that reaction conditions had stabilized.

Referring now to Table II it will be seen that the reference catalyst composition (5464-72) which comprised a commercially available 40 wt. % phosphate on aluminia catalyst of the type disclosed in Brennan U.S. Pat. No. 4,103,087 at column 8, lines 50-54 gave less satisfactory results than those obtained with the catalysts of the present invention. This run shows that with a pelleted aluminum phosphate catalyst, and in a continuous reaction, the results obtained are not so favorable as those reported for batch reactions in the copending application Ser. No. 283,713.

In particular, note that only about 77% of the triethylenetetramine fraction was noncyclic with this run. In contrast, with the catalyst of the present invention the noncyclic content was normally in excess of 90%. Note also that there was also a significantly smaller yield of diethylenetriamine with the reference catalyst.

The second reference tests (5495-4) was untreated titania pellets and it is seen that they were essentially inert insofar as conversion of monoethanolamine and ethylenediamine is concerned.

The type A titania supports catalysts wherein the source of phosphorus was phosphoric acid gave uniformly good results. The best pellet strength was obtained with the type B catalyst based on phosphoryl chloride.

Thus, Table II demonstrates that with titania supported pelleted catalyst in a continuous reaction system, it is possible to obtain excellent results in the reaction of monoethanolamine with ethylenediamine. The percentage of noncyclic reaction products is very high, being over 90% in all cases except for type G (when phosphorus bromide was the source of phosphorus). Note, however, that when phosphorous bromide was the source of the phosphorous, the yield of noncyclic reaction products was a distinct improvement in comparison with catalyst 5464-72. Diethylenetriamine yields of from about 55 to about 65% were obtained with this group of catalysts. Uniformly good yields of triethylenetetramine were also obtained.

dure outlined above in Example I. The pelleted catalysts were tested in the 100 cc continuous reactor described in Example I using the same conversion conditions. The catalyst compositions that were prepared are given in Table III. The results obtained with this group of catalysts is set out in Table IV.

TABLE III

| Type | Number | Composition |
|---|---|---|
| | 5464-72 | 40 wt % Phosphate on alumina |
| | 5484-37 | Zirconia |
| D | 5484-6 | Zirconia treated with 11 wt % phosphoric acid (H$_3$PO$_4$) for 1 hour at 125° C. |
| D | 5484-63 | Pelleted zirconia treated with phosphoric acid for 1 hour at 125° C. |
| D | 5484-17 | Zirconia treated with 22 wt % phosphoric acid for 1 hour at 125° C. |
| D | 5484-83 | Zirconia treated with 11 wt % phosphoric acid for 1 hour at 125° C. |
| D | 5484-84 | Zirconia treated with 11 wt % phosphoric acid for 2 hours at 125° C. |
| D | 5484-85 | Zirconia treated with 11 wt % phosphoric acid for 4 hours at 125° C. |
| D | 5494-71 | Zirconia treated with 11 wt % phosphoric acid for 24 hours at 125° C. |
| E | 5494-29 | Zirconia treated with phosphoryl chloride for 4 hours |
| E | 5494-30 | No. 5494-29 calcined at 600° C. for 16 hours |
| F | 5494-81 | Zirconia treated with phosphorous bromide for 2 hours |

TABLE II

TITANIA SUPPORTED PHOSPHOROUS CATALYSTS

| Catalyst | Phosphorous on Cat. (wt. %) | Temp., 0° C. @ 65% MEA Conv. | Selectivity | | | | | | Ratio: DETA PIP | TETA % N.C. | Pellet Strength | Cat. Type |
|---|---|---|---|---|---|---|---|---|---|---|---|---|
| | | | Pip. | DETA | AEEA | AEP & HEP | TETA | TEPA | | | | |
| 5464-72 | | 333 | 6.7 | 38.5 | 2.6 | 4.5 | 18.3 | 5.9 | 7.7 | 77 | | |
| 5494-4 | | — | — | — | — | — | — | — | — | — | | |
| 5494-16 | 2.2 | 331 | 2.6 | 61.8 | 0.5 | 1.6 | 18.0 | ~3 | 23.5 | 96 | 14 | A |
| 5494-5 | 1.9/2.2 | 328 | 2.7 | 59.2 | 0.6 | 2.3 | 19.5 | 4.5 | 23.5 | ~95 | 16 | A |
| 5494-17 | 1.6/2.2 | 306 | 2.2 | 52.9 | 0.6 | 1.8 | 18.5 | 3.4 | ~24 | 97 | 10 | A |
| 5494-95 | | 331 | 2.5 | 49.2 | ~0.5 | 2.3 | 17.8 | 2.8 | | 94 | | A |
| 5494-96 | | 333 | 2.5 | 57.3 | | 1.9 | 15.8 | ~1 | ~25 | 97 | | A |
| 5494-13 | 5.3 | 311 | 2.4 | 65.9 | 0.3 | 2.1 | 19.0 | >2.5 | 25.2 | 95 | 12.7 | B |
| 5494-23 | 6.5 | 314 | 2.3 | 66.3 | 0.4 | 1.8 | 19.6 | 3.5 | 27.2 | 96 | 18 | B |
| 5494-31 | | 323 | 2.4 | 59.2 | 1.2 | 1.7 | 18.2 | 3.0 | 29.7 | 97 | 9.7 | B |
| 5494-20 | | 325 | 5.0 | 54.4 | | 5.9 | 18.7 | 4.7 | 10.3 | 83 | | C |

TABLE IV

Zirconia Supported Phosphorous Catalysts

| Catalyst | Phosphorous on Cat. (wt. %) | Temp., 0° C. @ 65% MEA Conv. | Selectivity | | | | | | Ratio: DETA PIP | TETA % N.C. | Pellet Strength | Cat. Type |
|---|---|---|---|---|---|---|---|---|---|---|---|---|
| | | | Pip. | DETA | AEEA | AEP & HEP | TETA | TEPA | | | | |
| 5464-72 | | 333 | 6.7 | 37.5 | 1.8 | 5.9 | 19.7 | 7.7 | 5.8 | 76 | | |
| 5484-37 | | — | — | — | — | — | — | — | — | — | | |
| 5484-6 | | 316 | 3.9 | 54.2 | 0.9 | 1.5 | 17.1 | 2.4 | 15.7 | ~96 | | H |
| 5484-63 | | 318 | 3.5 | 56.4 | 1.3 | 2.1 | 15.8 | — | 15.3 | | | H |
| 5484-28 | | 322.5 | 3.7 | 56.2 | 1.1 | 2.2 | 16.8 | 2.2 | 15.4 | | | H |
| 5484-83 | | 322 | 5.1 | 50.8 | 0.7 | 3.7 | 15.5 | 3.0 | 10.5 | | | H |
| 5484-84 | | 320 | 4.4 | 54.0 | 0.4 | 2.5 | 15.2 | 3.1 | 12.5 | | | H |
| 5484-85 | | 322 | 4.8 | 55.6 | 0.9 | 2.2 | 12.4 | 2.4 | 12.3 | | | H |
| 5494-71 | | 319 | 3.4 | 71.3 | 1.0 | 2.0 | 19.5 | ~2 | 17.0 | 96 | 16.7 | H |
| 5494-29 | 0.9 | 328 | 4.8 | 56.5 | 0.4 | 3.2 | 18.5 | 6.0 | 11.5 | 91 | 8.0 | M |
| 5494-30 | 1.4 | 331 | 4.0 | 57.5 | 0.3 | 3.6 | 22.5 | 5.0 | 14.5 | 93 | 13.3 | N |
| 5494-81 | 2.0 | 332 | 4.6 | 62.7 | 1.2 | 2.6 | 20.6 | ~3.7 | 11.7 | 96 | 6.0 | Q |

$^{(1)}$The highest MEA conversion attained at this temperature was only about 24%

EXAMPLE II

Zirconia Supported Phosphorus Containing Catalyst Compositions

A series of phosphorus containing zirconia supported catalyst compositions were prepared using the proce- With reference to Table IV, it will be seen that once again there was a good conversion of the monoethanolamine and ethylenediamine to noncyclic products characterized by good yields of diethylenetriamine and triethylenetetramine.

This series of tests demonstrates that the zirconia supported catalysts give results equivalent to those obtained with titania.

There are times when it is desirable to obtain greater yields of the higher polyethylenepolyamines such as triethylenetetramine or tetraethylpentamine than those reported herein. In such instances, the diethylenetriamine can be recycled by substituting diethylenetriamine for all or a part of the ethylenediamine feedstock.

This specification includes data related to the invention disclosed and claimed herein and also, for comparative purposes, data is disclosed in this specification that is also disclosed and claimed in copending Vanderpool U.S. patent application Ser. No. 455,160, filed Jan. 3, 1983, of an even date herewith and entitled "Catalysts and Preparation of Linear Polyethylenepolyamines Therewith" Ser. No. 455,160 filed 1-3-83 now abandoned.

The foregoing examples of the present invention have been given by way of illustration only and are not intended as limitations on the scope of the invention which is defined by the following claims.

We claim:

1. In a method wherein monoethanolamine is reacted with ethylenediamine in the presence of a phosphorous containing catalyst to provide an essentially noncyclic product comprising polyethylenepolyamines, the improvement for conducting said process on a continuous basis which comprises:
   a. using, as a catalyst, a pelleted group $IV_b$ metal oxide having thermally chemically bonded thereto from about 0.5 wt. % to about 10 wt. % of phosphorous derived from phosphoryl chloride or phosphorous bromide,
   b. continuously contacting a mixture of ethylenediamine and monoethanolamine in a molar ratio of about 1 to 5 mols of ethylenediamine per mole of monoethanolamine with said pelleted catalyst at a temperature of about 250° to about 400° C. and a pressure of about 500 to about 3000 psig to obtain an essentially noncyclic reaction product.

2. A method as in claim 1, wehrein the group $IV_b$ metal oxide is titania.

3. A method as in claim 1, wherein the source of phosphorus is phosphoryl chloride.

4. A method as in claim 1, wherein the source of phosphorus is phosphorus bromide.

5. A method as in claim 1, wherein the group $IV_b$ metal oxide is zirconia.

6. A method as in claim 5, wherein the source of phosphorus is phosphoryl chloride.

7. A method as in claim 5, wherein the source of phosphorus is phosphorus bromide.

8. A method as in claim 1, wherein the reaction product is fractionated to obtain at least a fraction comprising diethylenetriamine and wherein at least a portion of said diethylenetriamine is recycled to the reaction zone together with the said feedstock.

9. In a method wherein monoethanolamine is reacted with ethylenediamine in the presence of a phosphorous containing catalyst to provide an essentially noncyclic product comprising polyethylenepolyamines, the improvement for conducting said process on a continuous basis which comprises:
   a. using, as a catalyst, a pelleted group $IV_b$ metal oxide having thermally chemically bonded thereto phosphorous derived from phosphoryl chloride or phosphorous bromide, said catalyst having been prepared by impregnating pellets of a group $IV_b$ metal oxide with a liquid containing, as a halide, phosphoryl chloride or phosphorous bromide, heating said impregnated pellets of about 100° C. to about reflux temperature for a period of time within the range of about 0.5 to 5 hours sufficient to thermally chemically bond from about 0.5 wt. % to about 10 wt. % of phosphorous to said pellets, and thereafter hydrolysing said halide and recovering and drying the thus treated pellets,
   b. continuously contacting a mixture of ethylenediamine and monoethanolamine in a molar ratio of about 1 to 5 mols of ethylenediamine per mole of monoethanolamine with said pelleted catalyst at a temperature of about 250° to about 400° C. and a pressure of about 500 to about 3000 psig to obtain an essentially noncyclic reaction product.

10. A method as in claim 9, wherein the group $IV_b$ metal oxide is titania.

11. A method as in claim 9, wherein the group $IV_b$ metal oxide is zirconia.

12. In a method wherein monoethanolamine is reacted with ethylenediamine in the presence of a phosphorous containing catalyst to provide an essentially noncyclic product comprising polyethylenepolyamines, the improvement for conducting said process on a continuous basis which comprises:
   a. using a catalyst composition consisting essentially of a pelleted group $IV_b$ metal oxide having thermally, chemically bonded thereto from about 0.5 wt. % to about 10 wt. % of phosphorous derived from phosphoryl chloride or phosphorous bromide,
   b. continuously contacting a mixture of ethylenediamine and monoethanolamine in a molar ratio of about 1 to 5 mols of ethylenediamine per mole of monoethanolamine with said pelleted catalyst at a temperature of about 250° to about 400° C. and a pressure of about 500 to about 3000 psig to obtain an essentially noncyclic reaction product.

13. In a method wherein monoethanolamine is reacted with ethylenediamine in the presence of a phosphorous containing catalyst to provide an essentially noncyclic product comprising polyethylenepolyamines, the improvement for conducting said process on a continuous basis which comprises:
   a. using a catalyst composition consisting essentially of a pelleted group $IV_b$ metal oxide having thermally chemically bonded thereto phosphorous derived from phosphoryl chloride or phosphorous bromide, said catalyst having been prepared by impregnating pellets of a group $IV_b$ metal oxide with a liquid containing, as a halide, phosphoryl chloride or phosphorous bromide, heating said impregnated pellets at a temperature of about 100° C. to about reflux temperature for a period of time within the range of about 0.5 to 5 hours sufficient to thermally chemically bond from about 0.5 wt. % to about 10 wt. % of phosphorous to said pellets, and thereafter hydrolysing said halide and recovering and drying the thus treated pellets,
   b. continuously contacting a mixture of ethylenediamine and monoethanolamine in a molar ratio of about 1 to 5 mols of ethylenediamine per mole of monoethanolamine with said pelleted catalyst at a temperature of about 250° to about 400° C. and a pressure of about 500 to about 3000 psig to obtain an essentially noncyclic reaction product.

14. A method as in claim 13, wherein the group $IV_b$ metal oxide is titania.

15. A method as in claim 13, wherein the group $IV_b$ metal oxide is zirconia.

* * * * *